(12) United States Patent
Wright et al.

(10) Patent No.: US 9,973,385 B2
(45) Date of Patent: May 15, 2018

(54) REMOTE SERVER CONFIGURATION

(75) Inventors: Edward Allen Wright, Tomball, TX (US); Darren J Cepulis, Houston, TX (US); Thomas A Schwartz, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1393 days.

(21) Appl. No.: 13/362,508

(22) Filed: Jan. 31, 2012

(65) Prior Publication Data

US 2013/0198349 A1 Aug. 1, 2013

(51) Int. Cl.
*H04L 12/24* (2006.01)
*G06F 9/445* (2018.01)
*G06F 9/4401* (2018.01)
*G06F 9/44* (2018.01)

(52) U.S. Cl.
CPC ...... *H04L 41/0883* (2013.01); *G06F 9/44505* (2013.01); *H04L 41/082* (2013.01); *G06F 9/4401* (2013.01)

(58) Field of Classification Search
CPC ............. H04L 41/0883; H04L 41/082; G06F 9/44505; G06F 9/4401
See application file for complete search history.

(56) References Cited

U.S. PATENT DOCUMENTS

| | | | | |
|---|---|---|---|---|
| 6,163,805 A * | 12/2000 | Silva et al. | | 709/227 |
| 6,345,294 B1 * | 2/2002 | O'Toole et al. | | 709/222 |
| 6,584,074 B1 * | 6/2003 | Vasamsetti et al. | | 370/254 |
| 6,772,204 B1 * | 8/2004 | Hansen | | 709/220 |
| 7,293,168 B2 * | 11/2007 | Maeda et al. | | 713/1 |
| 7,475,235 B1 * | 1/2009 | Bernardy et al. | | 713/1 |
| 7,620,707 B1 * | 11/2009 | Sutherland et al. | | 709/223 |
| RE41,030 E * | 12/2009 | Pham et al. | | 709/228 |
| 8,484,325 B1 * | 7/2013 | Maity | | 709/223 |
| 2003/0149796 A1 * | 8/2003 | Emerson et al. | | 709/250 |
| 2004/0163008 A1 * | 8/2004 | Kim | | 714/4 |
| 2007/0115709 A1 * | 5/2007 | Shih et al. | | 365/63 |
| 2007/0174429 A1 * | 7/2007 | Mazzaferri et al. | | 709/218 |
| 2010/0312863 A1 * | 12/2010 | Mohr | | 709/220 |
| 2012/0084408 A1 * | 4/2012 | Ayanam et al. | | 709/220 |
| 2013/0125107 A1 * | 5/2013 | Bandakka et al. | | 717/171 |
| 2013/0139234 A1 * | 5/2013 | Inbaraj et al. | | 726/7 |

* cited by examiner

*Primary Examiner* — Joe Chacko
(74) *Attorney, Agent, or Firm* — Wagner Blecher

(57) ABSTRACT

Remotely configuring an online computer system. A configuration file is generated at a management controller associated with a computer system in response to a request from a configuration utility associated with a user device, wherein the user device is located remotely from the computer system. The configuration file is sent from the management controller to the configuration utility via a network connection. A modified configuration file is received at the management controller from the configuration utility via the network connection, wherein the modified configuration file comprises system level changes to a configuration of the computer system. The system level changes from the modified configuration file are implemented at the computer system while an operating system associated with the computer system is online.

20 Claims, 3 Drawing Sheets

REMOTE SERVER CONFIGURATION

BACKGROUND

Computer systems, such as server computer system, have multiple components, subsystems, parts, etc. each with settings that can be changed or configured in a variety of ways. Some settings require that the computer system be shut down so that the settings may be configured. Changes to the configuration or settings may also require a user to be physically present at the computer system to take the computer system offline and off-network to make the changes. Some changes in configuration require a manual change or physical interaction with the computer system which also requires a user to be physically present at the computer system. Additionally, the components, subsystems, and parts of the computer system may have a variety of protocols, methods and techniques different from one another for changing or configuring settings.

Figure 1:
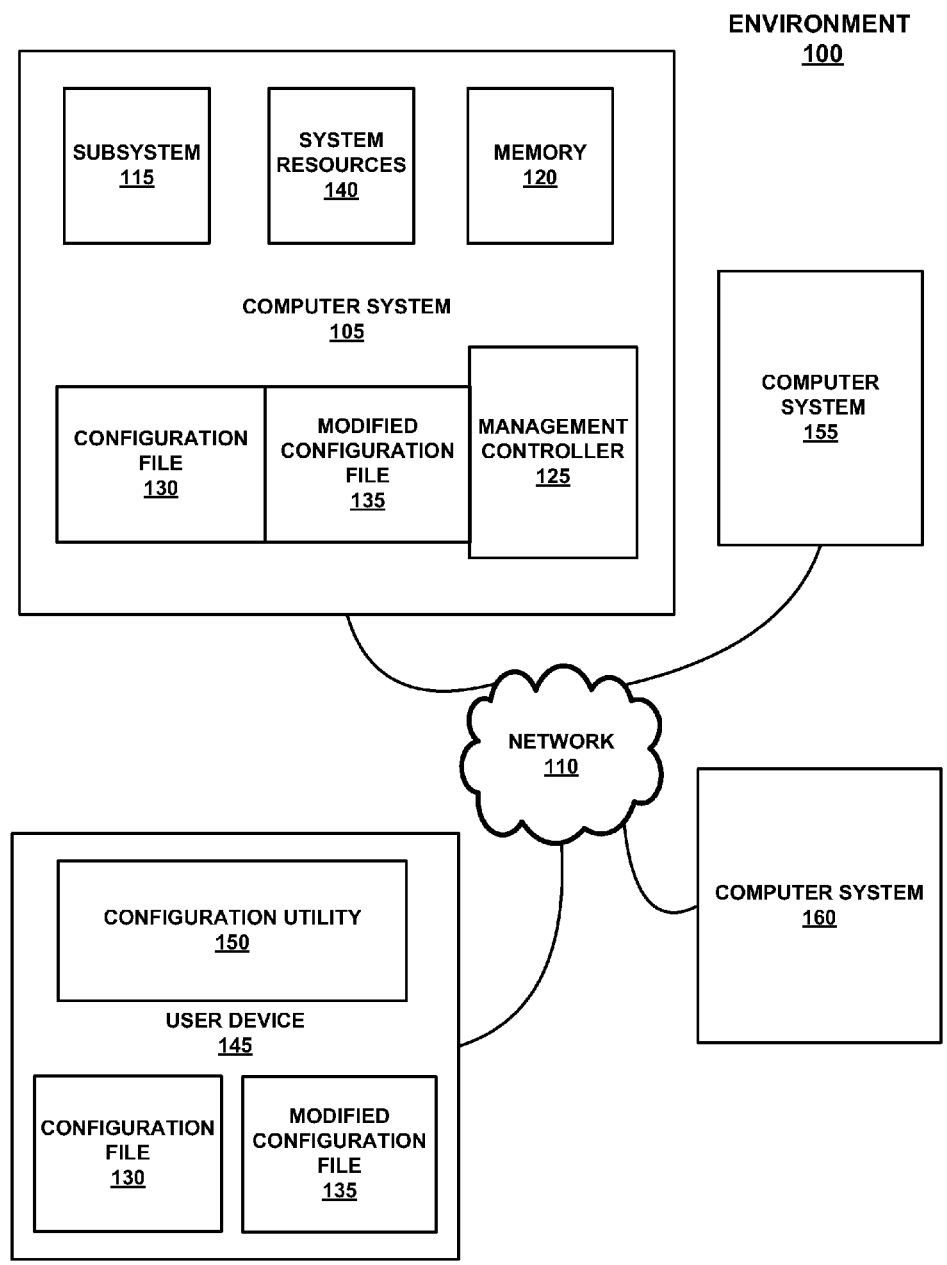
FIG. 1 illustrates a block diagram of an example environment for remote server configuration in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving", "generating", "sending", "implementing", "requesting", "pushing", "forwarding", "creating", "displaying", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Overview of Discussion

The present technology describes methods and systems for a remote online automatic profile based configuration utility that is used in server setup and optimization. The remote online automatic profile based configuration utility eliminates the requirement for the user to directly access a local server in order to make the necessary changes and instead allows control of the configuration changes to the server remotely while the server is online.

Computer systems may be configurable in a variety of different ways using different techniques, methods, protocols, etc. The computer system may have settings that may be configured including settings for different parts, subsystems and components of the computer system. This leads to multiple combinations of configurations that may be countless and may require and extensive knowledge of the computer system and the different parts, subsystems and components of the computer system. A user may wish to access the configuration of the computer system for reasons such as verifying configuration settings, optimizing settings, changing settings, updating configurations, etc.

The computer system may also require a user to be physically present at a computer system to make changes to configurations or settings. For example, a change to basic input/output (BIOS) of the computer system may require the computer system to be taken offline such that it is off-network and not running an operating system associated with the computer system. This would also require to the user to be physically present at the computer system as it is off-network. Other settings of the computer system may require manual or physical changes that also require the user to be physically present or even in physical contact with the computer system.

Some changes may require the computer system to be taken offline and off-network which may affect the efficiency of the computer system and may also negatively affect the workload tasks the computer system is expected to perform. Additionally, taking a computer system offline is inconvenient and disruptive to workflow. Thus, many solutions for changing the settings of a computer system of the drawbacks of requiring a user to be physically present at the computer system and require the computer system to be taken offline and off-network.

Another drawback of other solutions is that a user may be required to have extensive knowledge of how to configure a computer system including its components and subsystems. Additionally, the user may not know every option for every configuration related to the computer system. Thus a user may not be able to fully configure or take full advantage of optimization and efficiency based on changes in configurations because of limited user knowledge. The present technology operates to overcome the drawbacks of requiring a user to be physically present and the computer system to be taken offline and off-network as well as overcome the drawback of limited user knowledge.

The present technology allows a computer system to be configured remotely while the computer system is online. In one embodiment, the computer system comprises a management controller that receives a request for a configuration file. The configuration file is generated and may include predefined options for changes that can be made to the settings of the computer system. The configuration file is then sent to a user device running a configuration utility. The configuration utility displays the configuration file using a graphical user interface (GUI). The GUI may include fields where each field is limited to the predefined options. The user device and the computer system may be remote from one another and communicate over a network connection. The configuration utility creates a modified configuration file or an output file based on user input regarding changes to be made to the settings of the computer system. The modified configuration file is then sent from the user device to the management controller of the computer system. The modified configuration file is used to change settings or configure the computer system including changing settings and configuring subsystems and components. The changes to the computer system may be implemented using the management controller or the management controller may forward the changes to be made to a subsystem. Changes may be implemented by making changes to memory of the computer system or its subsystems while the computer system is online running an operating system and connected to a network. In one embodiment, a reboot of the computer system may be required to fully implement the changes.

The predefined options of the configuration file allow a user to effectively make changes and configure the computer system without requiring the user to have an extensive knowledge of the computer system and its subsystems. The predefined options may display in a drop down menu in the GUI. The predefined options may be identified or generated by the management controller gathering data and information from the computer system and its subsystems. The present technology allows a user to remotely configure the computer system using a user device that is remotely connected to the computer system over a network and thus the user is not required to be physically present at the computer system. The management controller allows changes and configurations to be implemented while the computer system is running, online and connected to a network. Thus the present technology does not require disruptions in the normal operations of the computer system to make configurations and changes to settings.

Configurations and changes to the settings of the computer system, its subsystems, and to the management controller may be described as system level changes. In one embodiment, system level changes are changes to the settings that typically require a user to be physically present at the computer system and require the computer system to be taken offline and off-network. However, the present technology may also operate to make changes to the computer system that may typically be performed remotely while the computer system is running.

The present technology may also operate using a one-to-many principle such that changes or configurations may be carried out to a plurality of computer systems. For example, a computer system may be one of a plurality of computer systems that are managed in a server farm. The plurality of computer systems may each be part of the same rack and may be part of the same management plan. Thus a user configuring or changing one computer system may wish for the same changes to be implements across each of the plurality of computer systems. The present technology may accomplish this using the management controllers of each computer systems. The management controllers of the computer systems communicate with one another and are aware of when another computer system is part of the same management plan. The user may indicate in the modified configuration file that the changes are to be implemented in each of the plurality of computer systems. The configuration utility and user device may only send the modified configuration file to one management controller of one computer system which in turns pushes or forwards the modified configuration file to each of the other management controllers of the plurality of computer systems. Alternatively, a user may specify which computer systems the modified configuration file is to be forwarded or pushed to.

The following discussion will demonstrate various hardware, software, and firmware components that are used with and for remotely configuring a computer system. Furthermore, the devices, computer systems and their methods may include some, all, or none of the hardware, software, and firmware components discussed below. Firmware and software as described herein are machine readable instructions.

Embodiments of Remote Server Configuration

With reference now to FIG. 1, a block diagram of an example environment for remote server configuration is shown in accordance with embodiments of the present technology. Environment 100 comprises components that may or may not be used with different embodiments of the present technology and should not be construed to limit the present technology.

In one embodiment, computer system 105 is a computer system such as server, server computer system, a blade server, etc. and may be one of a plurality of computer systems in a rack, a row, or other structures and may be part of a server farm. Computer system 105 may comprise subsystem 115, memory 120, management controller 125, and system resources 140. Computer system 105 may have a processor, chipset or other hardware components that are considered basic or core to computer system 105 and each may be configured. Computer system 105 may comprises a variety of software and firmware including operating systems, application software, and BIOS. Subsystem 115 represents a variety of subsystems, components or other parts that may be associated with computer system 105. Subsystem 115 may be a chipset, memory, an input output card, a network interface card, a redundant array of independent disks (RAID), a storage medium, a power supply or source, a cooling system, a fan, etc. System resources 140 may be resources central to computer system 105 such as a mother board or central processing unit. It should be appreciated that computer system 105, subsystem 115, and system resources 140 may all be changed or configured using the present technology.

Memory 120 may be non-volatile random access memory (NVRAM) or another type non-volatile storage medium. Subsystem 115 may also include its own memory with capabilities similar to memory 120. Memory 120 is capable of storing configuration settings for computer system 105 such that changes made to the configuration settings in memory 120 will lead to changes in the configuration of computer system 105. Such changes may or may not require a reboot of computer system 105 to load the changes made to memory 120.

In one embodiment, management controller 125 is a management controller, a base management controller, or an embedded management system which is a hardware component including a micro-processor and comprises software components. Management controller 125 is separate from a main processor(s) associated with computer system 105 and is used to manage computer system 105. Management controller 125 may be capable of gathering information regarding computer system 105 such as a temperature, environmental data, as well as data regarding subsystem 115. In one embodiment, management controller 125 is Hewlett-Packard Development Company's integrated lights out (iLO) management controller. A standard management controller such as iLO may require additional programming or altering to carry out embodiments of the present technology.

In one embodiment, management controller 125 is able to gather information regarding computer system 105, system resources 140 and subsystem 115 to create configuration file 130. Configuration file 130 may be generated by management controller 125 in response to a request from configuration utility 150 which received the request from a user. Configuration file 130 may contain all of the available platform specific configuration settings available for computer system 105. Configuration file 130 is then sent to configuration utility 150 associated with user device 145. Configuration file 130 may be an extensible markup language (XML) file, a Java script object notation JSON file, or another file type.

Configuration utility 150 may be described as a remote online automatic profile based configuration utility (Remote-PCU), a software utility, or a read only memory based setup utility (RBSU). Configuration utility 150 comprises a GUI, can read and display configuration file 130 and can generate modified configuration file 135. Configuration utility 150 displays configuration file 130 via user device 145. User device 145 may be a computer system, a notebook, a personal computer, a laptop, a netbook, a smartphone, a tablet, a handheld device, or other electronic device. Configuration utility 150 may display configuration file 130 with predefined options for possible changes to a configuration of computer system 105. For example, the GUI could display a field with a drop down menu that has limited options for selection. The present technology operates to present a user with a setting to change or configuration and is also presented with a range of options to select. Thus the present technology does not require a user to have an extensive knowledge of computer system 105, its settings and subsystem 115 to effectively configure computer system 105. In one embodiment, the GUI is consistent with interlaces used in solutions where the computer system is required to be offline to configure thus providing a similar experience to users with the new features of the present technology.

In one embodiment, configuration utility 150 is able to create modified configuration file 135. Modified configuration file 135 may be created or generated based on input received from the user at user device 145. Modified configuration file 130 may also be created using a template by correlating available configuration profile provide with a requested configuration template, this is accomplished by configuration utility 150 generating a list of requested changes. Modified configuration file 135 may also be an XML file, a JSON file or other file type and may be described as an output file. The modified configuration file 135 comprises changes to be implemented at computer system 105. Configuration utility 150 or modified configuration file 135 may request a reboot of computer system 105 after the changes in modified configuration file 135 have been implemented.

The changes may be system level changes that are typically performed when a computer system 105 is outside an operating system and is off-network. For example, prior solutions may have required a configuration change to bring down an operating system, take the computer system off-network and then reboot into BIOS, a pre-boot execution environment (PXE), or a boot image such as a Linux based script before a change could be made thus resulting in customer down time. The present technology allows these system level changes to be performed while the computer system 105 is online running an operating system and is networked. In one embodiment, the system level changes may be changes to basic input/output (BIOS) of the computer system, changes to subsystems of the computer system, changes to an input output card of the computer system, changes to a redundant array of independent disks of the computer system, changes to a power source of the computer system, and changes to a chipset of the computer system.

The present technology may be employed by a user to verify, check, change, examine, get, review, set, update, or optimize a setting for computer system 105. A user may employ the present technology without changing a setting but may merely observer or record what selection the setting is set at.

Computer systems 105, 155, and 160 and user device 145 may communicate over network 110. Network 110 is a standard network with standard protocols used by computer systems to communicate with one another and may be a local area network, a wireless network, the Internet, etc. In one embodiment, environment comprises more than one network. For example, computer system 105 and user device 145 may be connected with a first network and computer systems 105, 155 and 160 are connected using a second network. In this example, computer system 105 may forward the modified configuration file 135 from user device 145 to computer systems 155 and 160. Network connections between computer systems and user devices may be secure connections using stand security, encryption and firewall techniques.

Computer systems 155 and 160 have the same capabilities, features and components of computer system 105. Computer systems 155 and 160 each comprise a management controller similar to management controller 125. Environment 100 may comprise a plurality of computer systems including any number of computer systems and is not limited to computer systems 105, 155 and 160. The plurality of computer systems in environment 100 may be identical in hardware and software or may be different from one another. The management controllers of each of the plurality of computer systems are able to discover and communicate with one another if the computer systems are networked to one another. The management controllers are able to determine if a computer system is on the same management plan as its computer system. In one embodiment, the management controller 125 may forward or push modified configuration file 135 to another computer system. This may occur based on a command in the modified configuration file 135 or may occur automatically based on programming.

A standard management controller may have some limited capabilities to change configurations or settings associated with computer system 105. However, a standard management controller may not have the ability to allow a user to remotely access configuration settings and may not have the ability to change configurations for a subsystem especially a subsystem that is designed by a third party with protocols and techniques for changing the configurations that the standard management controller is not equipped to handle. The present technology goes beyond a standard management controller by allowing a user to remotely change settings or configurations of computer system 105 including settings in BIOS and subsystem 115. The present technology requires a great deal of integration and design to incorporate techniques, methods, protocols, procedures, and management and control requirements for each and every potential component, part or subsystem of a server computer system especially where the components or subsystems are designed by a third party relative to the designers of the management controller. Thus, the present technology would not have been obvious to design with standard management controllers and computer systems.

Operation

More generally, operations or methods are described for embodiments in accordance with the present technology, remote server configuration. Such methods can be implemented using computer systems, devices, and components described in FIG. 1.

Figure 2:
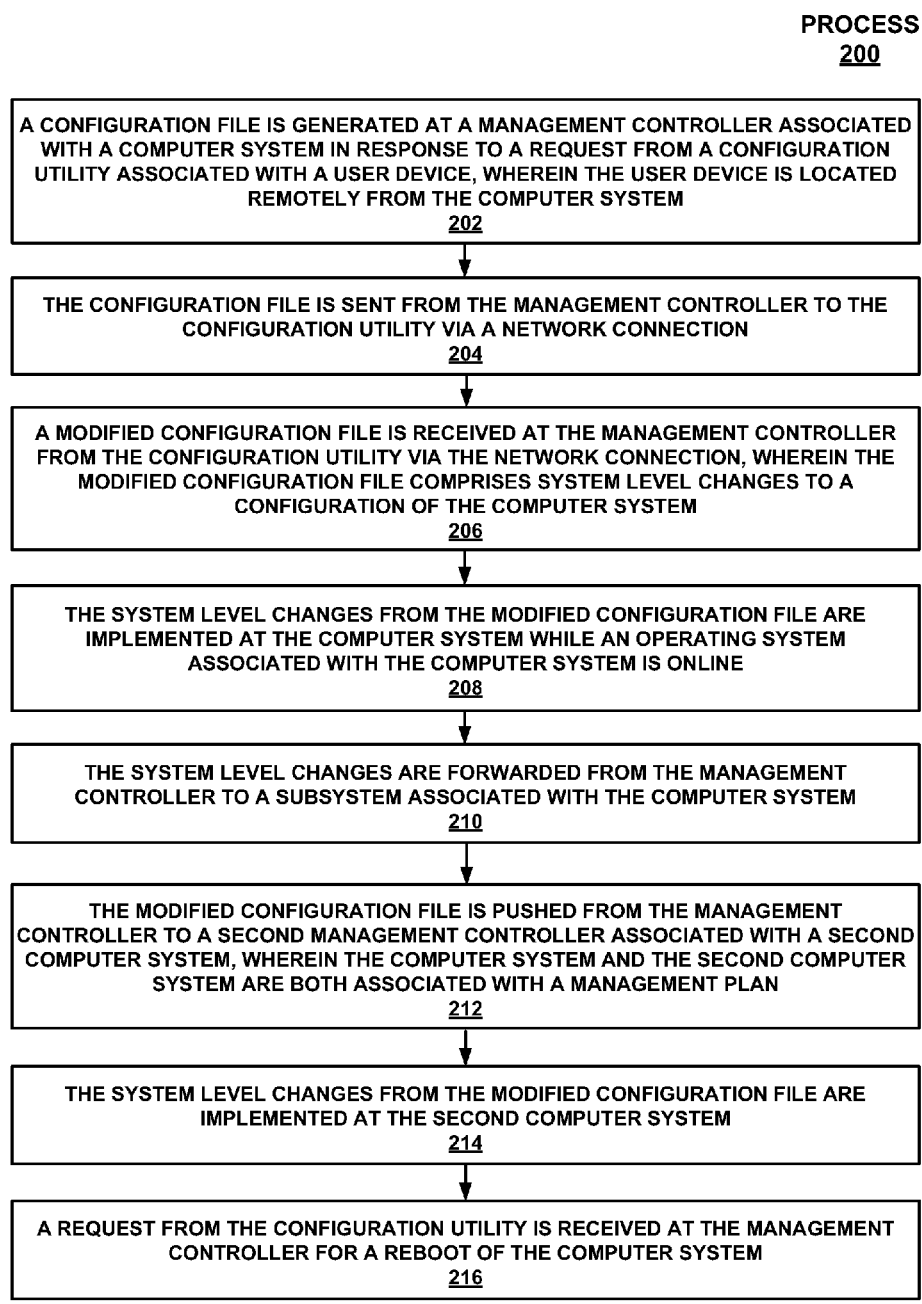
FIG. 2 illustrates a flowchart of an example method for remote server configuration in accordance with embodiments of the present technology.

FIG. 2 is a flowchart illustrating process 200 for remotely configuring an online computer system, in accordance with one embodiment of the present technology. In one embodiment, process 200 is carried out by processors and electrical components under the control of computer readable and computer executable instructions stored on a non-transitory computer-usable storage medium. The computer readable and computer executable instructions reside, for example, in non-transitory data storage features such as computer usable volatile and non-volatile memory. However, the computer readable and computer executable instructions may be non-transitory and may reside in any type of computer-usable storage medium. In one embodiment, process 200 is performed by environment 100 of FIG. 1.

At 202, a configuration file is generated at a management controller associated with a computer system in response to a request from a configuration utility associated with a user device, wherein the user device is located remotely from the computer system. In one embodiment, the configuration file is generated by the management controller based on table data received from the configuration utility.

At 204, the configuration file is sent from the management controller to the configuration utility via a network connection. In one embodiment, the network connection is secure using standard techniques. In one embodiment, the configuration file comprises predefined fields with predefined options for input from a user regarding the system level changes. In one embodiment, the configuration file comprises data for a graphical user interface when the configuration file is run via the configuration utility at the user device.

At 206, a modified configuration file is received at the management controller from the configuration utility via the network connection, wherein the modified configuration file comprises system level changes to a configuration of the computer system. In one embodiment, the system level changes may be changes to basic input/output (BIOS) of the computer system, changes to subsystems of the computer system, changes to an input output card of the computer system, changes to a redundant array of independent disks of the computer system, changes to a power source of the computer system, and changes to a chipset of the computer system. The modified configuration file may be generated or created at the configuration utility either based on user input or based on a template.

At 208, the system level changes from the modified configuration file are implemented at the computer system while an operating system associated with the computer system is online. In one embodiment, implementing the system level changes is carried out via the management controller making changes to a non-volatile random-access memory (NVRAM) of the computer system. In one embodiment, the configuration file and the modified configuration file comprises XML or JSON.

At 210, the system level changes are forwarded from the management controller to a subsystem associated with the computer system. In one embodiment, the changes are implemented at the subsystem by making changes to NVRAM associated with the subsystem.

At 212, the modified configuration file is pushed from the management controller to a second management controller associated with a second computer system, wherein the computer system and the second computer system are both associated with a management plan.

At 214, the system level changes from the modified configuration file are implemented at the second computer system.

At 216, a request from the configuration utility is received at the management controller for a reboot of the computer system. In one embodiment, the reboot can occur later at a predefined time. In one embodiment, the management controller forwards the request for a reboot to a system administrator.

Figure 3:
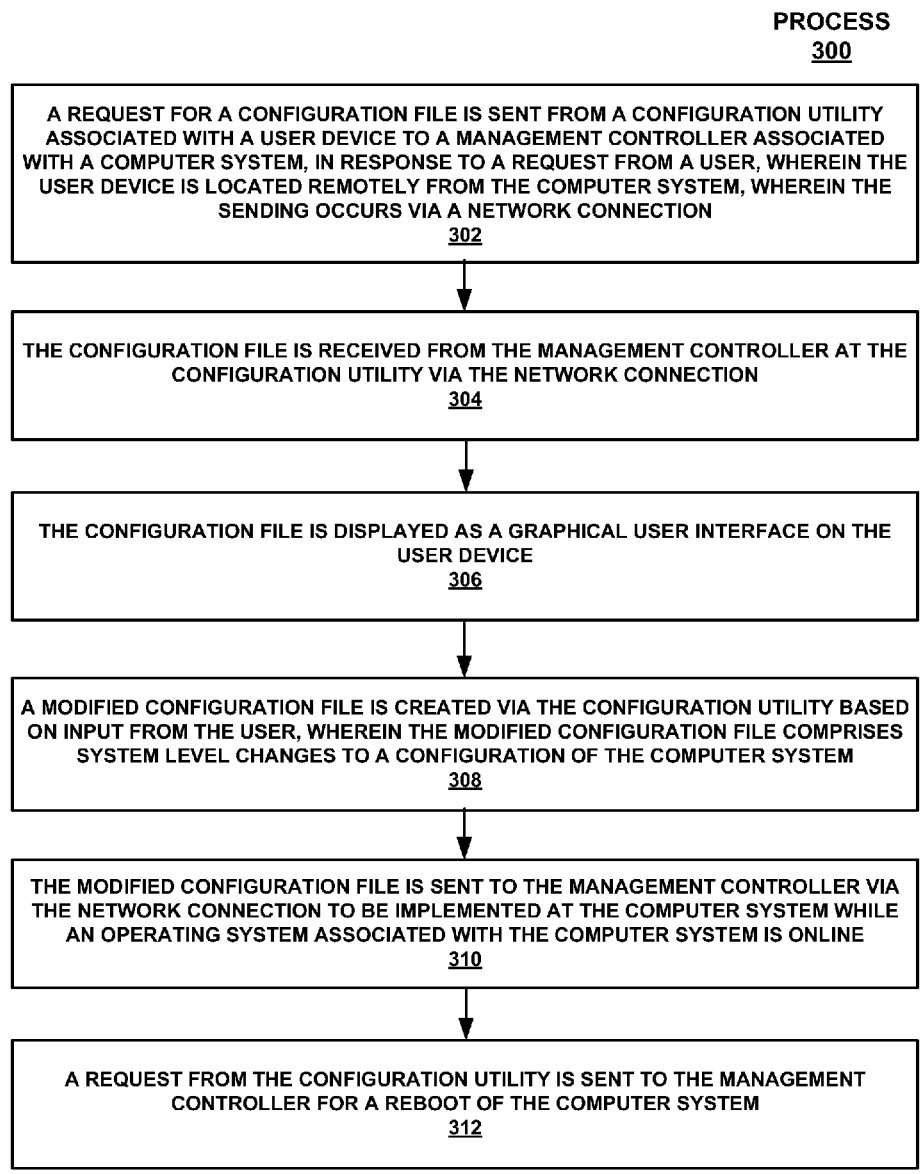
FIG. 3 illustrates a flowchart of an example method for remote server configuration in accordance with embodiments of the present technology.

FIG. 3 is a flowchart illustrating process 300 for remotely configuring an online computer system, in accordance with one embodiment of the present technology. In one embodiment, process 300 is carried out by processors and electrical components under the control of computer readable and computer executable instructions stored on a non-transitory computer-usable storage medium. The computer readable and computer executable instructions reside, for example, in non-transitory data storage features such as computer usable volatile and non-volatile memory. However, the computer readable and computer executable instructions may be non-transitory and may reside in any type of computer-usable storage medium. In one embodiment, process 300 is performed by environment 100 of FIG. 1.

At 302, a request for a configuration file is sent from a configuration utility associated with a user device to a management controller associated with a computer system, in response to a request from a user, wherein the user device is located remotely from the computer system, wherein the sending occurs via a network connection.

At 304, the configuration file is received from the management controller at the configuration utility via the network connection.

At 306, the configuration file is displayed as a graphical user interface on the user device.

At 308, a modified configuration file is created via the configuration utility based on input from the user, wherein the modified configuration file comprises system level changes to a configuration of the computer system. In one embodiment, the configuration file is created using a template by correlating available configuration profile provided with a requested configuration template in order to generate a list of request changes for inclusion in the modified configuration file.

At 310, the modified configuration file is sent to the management controller via the network connection to be implemented at the computer system while an operating system associated with the computer system is online.

At 312, a request from the configuration utility is sent to the management controller for a reboot of the computer system.

Example Computer System Environment

Portions of the present technology are composed of computer-readable and computer-executable instructions that reside, for example, in computer-usable media of a computer system. Described below is an example computer system or components that may be used for or in conjunction with aspects of the present technology. The example computer system may refer to any number of electronic devices including, but not limited to, personal computers, notebooks, netbooks, laptops, tablet computers, smartphones, handheld devices, server computer systems, etc.

It is appreciated that that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for remotely configuring an online computer system, said method comprising:
   generating a configuration file at a management controller which is a component of a computer system in response to a request from a configuration utility associated with a user device, wherein said user device is located remotely from said computer system;
   sending said configuration file from said management controller to said configuration utility via a network connection;
   receiving a modified configuration file at said management controller from said configuration utility via said network connection, wherein said modified configuration file comprises system level changes to a configuration of said computer system; and
   implementing said system level changes from said modified configuration file at said computer system while an operating system associated with said computer system is online.

2. The method of claim 1, further comprising:
   receiving a request from said configuration utility at said management controller for a reboot of said computer system.

3. The method of claim 1, further comprising:
   pushing said modified configuration file from said management controller to a second management controller associated with a second computer system for implementing said system level changes from said modified configuration file at said second computer system, wherein said computer system and said second computer system are both associated with a management plan.

4. The method of claim 1 wherein said network connection is a secure connection.

5. The method of claim 1 wherein said implementing said system level changes is carried out via said management controller making changes to a non-volatile random-access memory (NVRAM) of said computer system.

6. The method of claim 1 wherein said implementing said system level changes further comprises:
   forwarding said system level changes from said management controller to a subsystem associated with said computer system.

7. The method of claim 1 wherein said configuration file comprises predefined fields with predefined options for input from a user regarding said system level changes.

8. The method of claim 1 wherein said configuration file comprises data for a graphical user interface when said configuration file is run via said configuration utility at said user device.

9. The method of claim 1 where said system level changes are selected from the group of system level changes consisting of: changes to basic input/output (BIOS) of said computer system, changes to subsystems of said computer system, changes to an input output card of said computer system, changes to a redundant array of independent disks of said computer system, changes to a power source of said computer system, and changes to a chipset of said computer system.

10. The method of claim 1 wherein said configuration file is selected from the group of file formats consisting of: extensible markup language (XML) and java script object notation (JSON).

11. A method for remotely configuring an online computer system, said method comprising:
   sending a request for a configuration file from a configuration utility associated with a user device to a management controller which is a component of a computer system, in response to a request from a user, wherein said user device is located remotely from said computer system, wherein said sending occurs via a network connection;
   receiving said configuration file from said management controller at said configuration utility via said network connection;
   creating a modified configuration file via said configuration utility based on input from said user, wherein said modified configuration file comprises system level changes to a configuration of said computer system; and sending said modified configuration file to said management controller via said network connection to be implemented at said computer system while an operating system associated with said computer system is online.

12. The method of claim 11, further comprising:
sending a request from said configuration utility to said management controller for a reboot of said computer system.

13. The method of claim 11 wherein said modified configuration file comprises instructions for said management controller to push said configuration file to other management controllers associated with other computer systems for implementation of said system level changes on said other computer systems, wherein said other computer systems and said computer system are on a same management plan.

14. The method of claim 11 wherein said network connection is a secure connection.

15. The method of claim 11 wherein said configuration file comprises predefined fields with predefined options for said input from said user regarding said system level changes.

16. The method of claim 11, further comprising:
displaying said configuration file as a graphical user interface on said user device.

17. The method of claim 11 where said system level changes are selected from the group of system level changes consisting of: changes to basic input/output (BIOS) of said computer system, changes to subsystems of said computer system, changes to an input output card of said computer system, changes to a redundant array of independent disks of said computer system, changes to a power source of said computer system, and changes to a chipset of said computer system.

18. A non-transitory computer-usable storage medium having instructions embodied therein that when executed cause a computer system to perform a method for remotely configuring a plurality of online computer systems, said method comprising:

generating a configuration file at a management controller which is a component of a computer system in response to a request from a configuration utility associated with a user device, wherein said user device is located remotely from said computer system;

sending said configuration file from said management controller to said configuration utility via a network connection;

receiving a modified configuration file at said management controller from said configuration utility via said network connection, wherein said modified configuration file comprises system level changes to a configuration of said computer system;

implementing said system level changes from said modified configuration file at said computer system while an operating system associated with said computer system is online;

pushing said modified configuration file from said management controller to a second management controller associated with a second computer system, wherein said computer system and said second computer system are both associated with a management plan; and implementing said system level changes from said modified configuration file at said second computer system.

19. The non-transitory computer-usable storage medium of claim 18, further comprising:
receiving a request from said configuration utility at said management controller for a reboot of said computer system.

20. The non-transitory computer-usable storage medium of claim 18 where said system level changes are selected from the group of system level changes consisting of: changes to basic input/output (BIOS) of said computer system, changes to subsystems of said computer system, changes to an input output card of said computer system, changes to a redundant array of independent disks of said computer system, changes to a power source of said computer system, and changes to a chipset of said computer system.

* * * * *